United States Patent [19]

Paulonis et al.

[11] 3,753,794

[45] Aug. 21, 1973

[54] INTERLAYER FOIL FOR DIFFUSION BONDING

[75] Inventors: Daniel F. Paulonis, Killingworth; David S. Duvall, Middletown; Rodney H. Hawkins, Naugatuck, all of Conn.

[73] Assignee: United Aircraft Corporation, East Hartford, Conn.

[22] Filed: Mar. 20, 1972

[21] Appl. No.: 236,500

[52] U.S. Cl. .................. 148/32, 29/180, 29/194
[51] Int. Cl. .................................... C22c 19/00
[58] Field of Search ............... 29/194, 504; 148/32, 148/39

[56] References Cited
UNITED STATES PATENTS

| | | | |
|---|---|---|---|
| 3,088,192 | 5/1963 | Turner | 29/194 X |
| 3,197,858 | 8/1965 | Feduska et al | 29/494 |
| 3,530,568 | 9/1970 | Owczarski et al. | 29/498 |
| 3,549,339 | 12/1970 | Cape | 29/194 |
| 3,692,501 | 9/1972 | Hoppin et al. | 29/194 X |

Primary Examiner—L. Dewayne Rutledge
Assistant Examiner—E. L. Weise
Attorney—Richard N. James

[57] ABSTRACT

For use in the diffusion bonding of the nickel-base superalloys, a normally brittle interlayer material significantly matched in composition to the superalloy is provided as a thin ductile foil of relatively low overall melting point.

5 Claims, No Drawings

INTERLAYER FOIL FOR DIFFUSION BONDING

BACKGROUND OF THE INVENTION

This invention relates in general to the art of diffusion bonding and, more particularly, to the diffusion bonding of the nickel-base superalloys.

Diffusion bonding, which involves the solid-state movement of atoms and grain growth across a joint interface, offers particular promise as a joining technique for articles formed from the superalloys. It has been demonstrated, for example, that complex assemblies may be fabricated from these alloys by diffusion bonding with the provision of bonded areas which are practically indistinguishable from the adjacent areas of the parent metal even upon close metallurgical examination. In this regard, reference may be made to the U.S. Pat. to Owczarski et al, 3,530,568.

Since diffusion bonding is fundamentally based on a solid-state transport phenomena, it necessarily follows that carefully prepared and matched faying surfaces are mandatory if satisfactory joints are to be made. This in turn makes the typical diffusion bonding fabrication process both sensitive to precise process control and expensive. For interface areas of complex geometry, this is, of course, difficult even with precise control. Furthermore, certain desirable interface geometries are quite difficult to bond if pressure is not applied uniformly over the entire interface area, and interfacial defects often result if insufficient localized deformation cannot be applied. The problem is principally related to the necessity for sufficient surface-to-surface contact for the solid-state transport phenomena to occur uniformly across the joint.

It should be noted that brazing operations are not as sensitive to the precision of the match between faying surfaces as is diffusion bonding inasmuch as the flow of molten braze material tends to fill any gaps existing between the surfaces. In a brazed joint, however, although some degree of interalloying takes place between the braze material and the base alloy, the efficiency of the joint is nevertheless principally dependent upon the strength of the brazing alloy itself. And this is true even though some brazing operations permit sufficient interalloying of the braze material, through the diffusion of materials like boron, to provide a brazed joint having a higher remelt temperature than that of the original brazing alloy.

In prior work there have been investigated bonding systems wherein certain brazing and diffusion bonding features have been combined. In these developments, the melting point depressant effect of boron, carbon or silicon together with their high diffusion rates have been utilized as interface materials in diffusion bonding processes, the interface material assuring good initial surface contact in the early stage of the bonding sequence through melting and flow of the interlayer material with subsequent processing providing solid-state bonding. A particularly promising scheme is disclosed in the copending application of Paulonis et al, Ser. No. 130,149 filed Apr. 1, 1971, of common assignee with the present case.

The application of the techniques resultant from these various developments is not, however, as straightforward as the art might appear to suggest, particularly in the case of the superalloys. As illustrative of the problem is the fact that while the various interlayer melting point depressants suggested in the art, such as boron, silicon, manganese, columbium and titanium, may in fact provide the interlayer alloys with satisfactory melting points, most are unusable with the stronger superalloys because of the formation of deleterious phases during diffusion, including the brittle intermetallics. In addition, problems such as lack of wettability, inability to control interlayer thickness, and severe base metal erosion may be present.

In the case of the interlayer material itself, the melting point depressants typically embrittle the interlayer alloys. Accordingly, the interlayer material is typically provided in powder form between the faying surfaces. However, this is not entirely satisfactory for several reasons. First, it is difficult to control interlayer thickness and, secondly, extreme care must be exercised both in handling and in processing to prevent dislodgment of the interlayer powder from the surfaces.

In many brazing applications, the problem with powder handling is solved by the simple expedient of providing the brazing alloy in foil form of controlled thickness. The U.S. Pat. No. to Cape 3,549,339 also recognizes that some of the braze materials may be brittle and suggests, therefore, that the brittle alloy be sprayed on a ductile strip. In the thicknesses required of brazing operations and where reliance may be had on the mechanical properties of the braze alloy itself, this appears satisfactory, for the coated foil may be formed to surfaces of reasonable complexity.

Diffusion bonding processes, however, are more sensitive to interlayer thickness and quantities of temperature depressant additives than are brazing processes, if true homogeneous diffusion bonded joints are to be reproducibly obtained.

The use of thin sheets of interlayer material in diffusion bonding processes has also been generally suggested as evidenced by the U.S. Pat. No. to Feduska et al, 3,197,858, which, in fact, recognizes the specter of uncontrollability present in the use of powder and other forms of the material. The problem of foil brittleness, however, does not appear to have been resolved although the alloys discussed, with their low content of strengthening precipitate-formers may have minimized the problem.

SUMMARY OF THE INVENTION

The invention involved here contemplates the provision of an interlayer foil of particular composition and metallographic character for the diffusion bonding of the rich nickel-base superalloys. The foil provided is sufficiently ductile to permit use between faying surfaces of even complex geometry and is further formulated to provide the optimum composition, in a diffusion bonding sense, for effecting a homogeneous diffusion bond.

The net result is a ductile interlayer foil uniquely adapted to the transient liquid phase bonding of the rich superalloys.

DESCRIPTION OF THE PREFERRED EMBODIMENT

The promise of diffusion bonding techniques for joining the rich superalloys has for some time been recognized, but not very widely applied, principally because of the unsatisfactory nature of the bonds, lack of reproducibility, and the associated problems of quality control. The rich superalloys present particularly unique diffusion bonding problems.

The general results incident to the use of the transient liquid phase diffusion bonding techniques described in the aforementioned copending application reveal that, with care, truly outstanding diffusion bonds are indeed possible and practical. However, for production purposes an interlayer material in foil form is almost a necessity.

As used herein, the rich nickel-base superalloys are those having strengths at 1,300° F. sufficient to limit creep to a maximum of 0.1 percent in 150 hours under a load of 80,000 p.s.i. These are further typically characterized by the presence of substantial quantities of aluminum and/or titanium, typically in excess of 5 or 6 percent. Representative of such alloys are those having a representative chemistry as follows: (by weight) 10% Cr, 15% Co, 4.5% Ti, 5.5% Al, 3% Mo, 0.17% C, 1% V, 0.015% B, 0.06% Zr. Other alloys of the same general type include:
Alloy A - 9% Cr, 10% Co, 2% Ti, 5% Al, 7.8% Mo, 12.5% W, 0.15% C, 1% Cb, 0.015% B, 0.05% Zr — and
Alloy B — 15% Cr, 15% Co, 3.4% Ti, 4.3% Al, 4.4% Mo, 0.07% C, 0.02% B.

In accordance with the present invention the interlayer foil for diffusion bonding is generally from 0.0005 to 0.005 inch in thickness, and generally from diffusion bonding considerations, as thin as possible preferably about 0.0005 to 0.002 inch thick. Since sufficient melt must be provided to take care of discontinuities between the faying surfaces, foil thickness of 0.002 0.004 are usually used. The compositions of the foil, as mentioned are tailored to provide a suitable homogeneous diffusion bonded joint. For these alloys, boron is the temperature depressant utilized, usually in an amount up to 3.5 weight percent based on the total foil depending upon the degree of temperature depression desired and most often in the range of 2–3.5 weight percent. Beyond about 3.5 percent boron, the temperature depressant effect reverses and, the alloy melting point increases. Thus, the upper boron limit is established by practical considerations.

be such a high boron content, the alloys per se are inherently extremely brittle and in this form (as the boron containing alloy) they cannot e rolled into foil or be plastically deformed in any manner without fracture.

In order to not only produce the boron-containing foil but also to provide one suitable for diffusion bonding and usable with joints of complex configuration, the basic foil is produced in two distinct stages. A basis alloy minus the embrittling element or elements, i.e., minus those elements in such quantity to substantially destroy ductility, is first produced in foil form. This is, of course, no problem since in the absence of the embrittling elements the alloy is ductile. Subseqent to the preparation of the basis alloy foil, the surface thereof is boronized using any of the well-known techniques suitable for the material and providing no contamination or introduction of undesirable species.

The thickness of the foil is established in the ductile form and the boronizing process may be closely controlled to provide the precise boron level desired. As previously mentioned, the minimum quantity of boron provided at the interface is that necessary to effect the temperature depression effect desired. The maximum on the other hand is that which can be readily diffused away without having any harmful residual effect at or adjacent to the joint area.

Two factors influence the total quantity of boron provided, i.e., the concentration and the depth to which the boronizing is effected. Boronizing cannot be effected such as to drive substantial boron entirely through the foil while retaining ductility of the foil. Generally, a ductile core of at least 25 percent of the total thickness should be maintained and usually the requisite quantity of boron can be provided if boronizing is essentially confined to a penetration of about 30 percent per side of foil.

In the boronizing process, the boron is not provided in the foil as elemental boron for the most part but rather as rather high melting point borides which are the reaction product of boron with the substrate elements. Although the borides are brittle, they are nevertheless adherent. Accordingly, when properly boronized, the surface of the foil may crack when bent severely but the surface will not peel or flake off and the core will retain its integrity.

As previously observed, the surface of the foil comprises borides. These have a melting point in excess of that desired for the diffusion bonding operation. For this reason if substantial boron is introduced entirely through the foil not only is foil ductility destroyed, but the foil is otherwise normally unusable for the purpose intended because it cannot be melted in the range desired for the diffusion bonding operation. For the same reason, the foil of the present invention having a ductile core with a boronized outer layer first melts not at the outer surface of the foil but at the boronized layer/ductile core interface. Thus, for proper operation in the diffusion bonding process, the foil is dependent upon the retention of a substantially unboronized core in contact with a boronized outer layer.

A number of interlayer foils were produced and tested. In one case a 0.003 inch ductile foil was produced by first rolling a simple nickel-15 percent chromium alloy with subsequent boronizing to an overall composition of nickel-15 weight percent chromium-3.2 percent boron. Although the foregoing alloy per se is very brittle and inflexible at this overall composition, the boronized foil of the present invention at this same overall composition could be punched into round preform shape and bent severely even without fracture although in very severe bends the outer layer displayed cracks, yet remained adherent. In an actual bonding process specimens formed of Alloy B were joined with this foil. During bonding the foil interlayer melted and behaved identically with chemically homogeneous brittle interlayer powders of the same composition used in prior work. Similar results were obtained with a 0.003 inch interlayer foil at an overall composition of nickel-15 percent chromium-2.3 percent boron. Thus, the basic utility was established.

It was recognized that to some degree the more closely the foil composition can be made to approach that of the parent metal to be joined, the greater the potential for homogeneity at the completed joint. This is not to imply that the parent metal per se simply be utilized and boronized as suggested in the prior art. The superalloy composition of the parent metal may in fact not be sufficiently ductile to permit rolling into foil or extrusion into wire even in the absence of substantial boron. Secondly, because of the formation of brittle intermetallic layers at the interface, titanium, aluminum and carbon must be substantially excluded from the inerlayer alloy. Thirdly, although the prior art might appear to suggest otherwise for some alloys, boron should be utilized as the principal temperature depressant.

Thus, in the most preferred interlayer composition, there will normally be included those elements in those quantities found in the parent metal to be joined which do not form deleterious layers or phases in diffusion bonding. In particular, the inclusion of those elements whose diffusivities are low is advantageous. Ductile foils to the following compositions have established the efficacy of this approach: Nickel-15 percent chromium-15 percent cobalt-2.5 percent boron and nickel-15 percent chromium-15 percent cobalt-5 percent molybdenum-3 percent boron.

The invention is not particularly sensitive to the boronizing process actually utilized in the manufacture of the foil. Such a boronizing operation has been effected by the simple expedient of forming a colloidal suspension of boron in a vaporizable dispersant, painting the outer surface therewith and drying, and subsequently heat treating to form the desired boride outer layer. Other satisfactory processes include boronizing from boride salts in a molten salt bath, pack cementation using boron powder, ammonium chloride and alumina in a hydrogen furnace, and direct reaction from gaseous boron trichloride. Foil has also been boronized by the Materials Development Corporation, Boston, Massachusetts using their proprietary process.

From the foregoing it may readily be seen that:

a. an interlayer foil is provided which may easily be prepared and handled prior to bonding and can be cut, bent and shaped into a preform to fit almost any mating surface geometry and contour;

b. the thickness and composition of the foil can be precisely selected and maintained to allow close control of the amount of interlayer and its constituents during bonding, leading not only to joints of high efficiency but also lending reproducibility to the process; and c. cleanliness of the joint is enhanced since the potential bond contamination which can occur with other methods is substantially reduced.

It is obvious that the techniques herein described are as applicable to the production of wire as well as foil. It should also be pointed out that, depending upon the particular application in mind, greater or lesser degrees of joint homogeneity may be required. In some situations, therefore, it may not be necessary to maintain the joint at temperature for complete homogenization to occur, particularly when the joint strength requirement is low.

Accordingly, although the invention has been described in detail in connection with certain examples and preferred embodiments, the invention in its broader aspects is not limited to the specific details shown and described but departures may be made therefrom without departing from the principles of the invention and without sacrificing its chief advantages.

We claim:

1. An interlayer alloy article having utility in the diffusion bonding of the nickel-base superalloys subject to the formation of deleterious phases at the faying surfaces in the diffusion bonding process which comprises, based on the total alloy content of the article a nickel-base interlayer alloy containing about 5–35 percent chromium with chromium content approximating that of the superalloy to be bonded and about 1.5–3.5 percent boron, the interlayer alloy being characterized further by the substantial absence of aluminum, titanium and carbon and having a melting point within the diffusion bonding temperature range of interest, the interlayer alloy still further being segregated into a ductile core and an outer layer consisting essentially of the reaction products of boron with the alloy comprising the core with the boron content of the interlayer alloy being substantially concentrated in the outer layer, both the outer layer and the alloy comprising the core having a melting point in excess of that of the interlayer alloy based on its overall composition.

2. An article according to claim 1 wherein:
the article is foil having a thickness of 0.0005–0.005 inch.

3. An article according to claim 2 wherein:
the nickel-base superalloys are of the $\gamma - \gamma'$ type having a combined aluminum plus titanium content in excess of about 6 percent by weight.

4. An article according to claim 3 wherein:
the interlayer alloy also contains 10–35 percent of elements selected from the group consisting of cobalt, tungsten, tantalum and molybdenum with the concentration of each element, as included, approximating that of the superalloy to be bonded.

5. An article according to claim 3 wherein:
the interlayer alloy has a melting point in excess of about 1,930° F. but below the incipient melting point of the superalloy to be bonded.

* * * * *